US011958721B2

(12) United States Patent
Auvinen et al.

(10) Patent No.: US 11,958,721 B2
(45) Date of Patent: Apr. 16, 2024

(54) ELEVATOR MONITORING IN SHUTTLE MODE

(71) Applicant: KONE Corporation, Helsinki (FI)

(72) Inventors: Juuso Auvinen, Helsinki (FI); Otto Miettinen, Helsinki (FI); Dipti Sonawane, Helsinki (FI); Marju Kettunen-Vaittinen, Vantaa (FI)

(73) Assignee: KONE Corporation, Helsinki (FI)

( * ) Notice: Subject to any disclaimer, the term of this patent is extended or adjusted under 35 U.S.C. 154(b) by 1317 days.

(21) Appl. No.: 16/504,648

(22) Filed: Jul. 8, 2019

(65) Prior Publication Data

US 2019/0337757 A1 Nov. 7, 2019

Related U.S. Application Data

(63) Continuation of application No. PCT/EP2018/051809, filed on Jan. 25, 2018.

(30) Foreign Application Priority Data

Feb. 7, 2017 (EP) .................................... 17154915

(51) Int. Cl.
*B66B 3/00* (2006.01)
*B66B 1/24* (2006.01)
*B66B 1/46* (2006.01)

(52) U.S. Cl.
CPC ............ *B66B 3/002* (2013.01); *B66B 1/2466* (2013.01); *B66B 1/468* (2013.01); *B66B 2201/303* (2013.01)

(58) Field of Classification Search
CPC ....... B66B 3/002; B66B 1/2466; B66B 1/468; B66B 2201/303; B66B 3/00
See application file for complete search history.

(56) References Cited

U.S. PATENT DOCUMENTS

| | | | |
|---|---|---|---|
| 2003/0000776 | A1 | 1/2003 | Kostka |
| 2007/0039785 | A1 | 2/2007 | Smith et al. |
| 2012/0279807 | A1 | 11/2012 | Finschi et al. |

(Continued)

FOREIGN PATENT DOCUMENTS

| | | | |
|---|---|---|---|
| CN | 1191982 | C | 3/2005 |
| CN | 102482048 | A | 5/2012 |
| CN | 103420233 | A | 12/2013 |

(Continued)

*Primary Examiner* — Jeffrey Donels
(74) *Attorney, Agent, or Firm* — Birch, Stewart, Kolasch & Birch, LLP

(57) ABSTRACT

A method monitors a plurality of elevators, in which at least two elevators are set into shuttle mode in which the corresponding elevator travels between two pre-defined floors. The method calculates at least one of an arrival time and a departure time of an elevator car of each of the at least two elevators in shuttle mode at a predetermined floor; determines a time required by a user for reaching each of the at least two elevators in shuttle mode from an operation terminal location; and calculates a preference order of the at least two elevators in shuttle mode on the basis of the time of arrival and/or departure of the elevator car of each of the at least two elevators in shuttle mode and the time required by the user for reaching each of the at least two elevators in the shuttle mode from the operation terminal location.

19 Claims, 6 Drawing Sheets

(56) References Cited

U.S. PATENT DOCUMENTS

| | | | | |
|---|---|---|---|---|
| 2013/0126277 | A1* | 5/2013 | Friedman | B66B 3/00 187/384 |
| 2016/0167920 | A1 | 6/2016 | Freeman et al. | |

FOREIGN PATENT DOCUMENTS

| | | | | |
|---|---|---|---|---|
| EP | 2597063 | A1 * | 5/2013 | B66B 1/2408 |
| JP | 2015-30613 | A | 2/2015 | |
| WO | WO 2008/116963 | A1 | 10/2008 | |

* cited by examiner

ELEVATOR MONITORING IN SHUTTLE MODE

CROSS REFERENCE TO RELATED APPLICATIONS

This application is a Continuation of PCT International Application No. PCT/EP2018/051809 filed on Jan. 25, 2018, which claims priority under 35 U.S.C. § 119(a) to Patent Application No. 17154915.7 filed in Europe on Feb. 7, 2017, all of which are hereby expressly incorporated by reference into the present application.

BACKGROUND

Field

The present invention relates to devices, methods, systems, and computer program products usable for improving efficiency and user experience when using an elevator system having a plurality of elevators of which some are operated in a so-called shuttle mode.

Background Art

The following description of background art and examples may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

In some buildings, a destination call elevator system is implemented where a passenger or the user calls for an elevator by inputting a destination floor number or the like by input in a call terminal destination operating panel (DOP), which is also referred to as operation terminal, at a landing before entering the elevator. For example, the user registers a floor call by manual input or by inputting data (such as an access code for a specific floor) via radio frequency identification (RFID) card or the like, before entering the elevator car. The system then identifies the elevator most suitable for the intended travel, and the DOP lets the user know which elevator is to wait for. Thus, it can be avoided that everyone is boarding the next car. In this way, travel time can be reduced and transport efficiency is increased, while at the same time the user experience is improved.

During peak traffic hours, e.g. when offices are opened at the morning, a so-called shuttle mode may be used. In the shuttle mode, one or more elevators of the building are set into a special operation mode in which it only travels between two pre-defined floors, while other elevators are kept in a normal operation mode.

Usually, elevators being set in the shuttle mode are identified in a specific manner, e.g. by a corresponding indication at the elevator, and/or the call terminal provides an indication for the next shuttle elevator leaving. Departure of elevators in shuttle mode is initiated, for example, when the elevator car has reached a predetermined passenger load, or when a predetermined time since the arrival at this floor has elapsed, or the like.

Thus, by using the shuttle mode, the passenger traffic at a peak time can be split and distributed to one or more additional points of concentration (also referred to as skylobbies) from where the users can reach their final destination in an easier way. Consequently, transport efficiency can be further increased.

Embodiments of the present invention are related to a mechanism, i.e. devices, methods, systems and computer program products, by means of which efficiency and user experience when using an elevator system having a plurality of elevators of which some are operated in a so-called shuttle mode can be further improved.

SUMMARY

According to an example of an embodiment, there is provided, for example, a method including monitoring a plurality of elevators, wherein at least two of the plurality of elevators are set into a shuttle mode in which the corresponding elevator travels between two pre-defined floors; calculating at least one of an arrival time and a departure time of an elevator car of each of the at least two elevators in the shuttle mode at a predetermined floor; determining a time required by a user for reaching each of the at least two elevators in the shuttle mode from an operation terminal location; calculating a preference order of the at least two elevators in the shuttle mode on the basis of the time of arrival and/or departure of the elevator car of each of the at least two elevators in the shuttle mode and the time required by the user for reaching each of the at least two elevators in the shuttle mode from the operation terminal location; assigning one of a plurality of display modes to each of the at least two elevators in the shuttle mode according to the preference order; and causing displaying of an elevator identification according to the preference order by using the assigned display mode.

Furthermore, according to an example of an embodiment, there is provided, for example, a device configured to monitor a plurality of elevators, wherein at least two of the plurality of elevators are set into a shuttle mode in which the corresponding elevator travels between two pre-defined floors, the device including means for calculating at least one of an arrival time and a departure time of an elevator car of each of the at least two elevators in the shuttle mode at a predetermined floor; means for determining a time required by a user for reaching each of the at least two elevators in the shuttle mode from an operation terminal location; means for calculating a preference order of the at least two elevators in the shuttle mode on the basis of the time of arrival and/or departure of the elevator car of each of the at least two elevators in the shuttle mode and the time required by the user for reaching each of the at least two elevators in the shuttle mode from the operation terminal location; means for assigning one of a plurality of display modes to each of the at least two elevators in the shuttle mode according to the preference order; and means for causing displaying of an elevator identification according to the preference order by using the assigned display mode.

According to further refinements, these examples may include one or more of the following features:

- when calculating a departure time of an elevator car of each of the at least two elevators in the shuttle mode at a predetermined floor, an estimated stop time period of each of the at least two elevators in the shuttle mode may be used;
- a plurality of operation terminals placed at different locations may be considered, wherein, when determining the time required by the user for reaching each of the at least two elevators in the shuttle mode, a time from each of the plurality of operation terminals may be determined, and, when calculating the preference order of the at least two elevators in the shuttle mode, a preference order for each of the plurality of operation terminals may be calculated;

a request for a specific destination of an elevator transport may be received and processed, and, when calculating the preference order of the at least two elevators in the shuttle mode, only those of the at least two elevators in the shuttle mode traveling to the requested destination may be considered;

additional information related to a number of persons already waiting for each of the at least two elevators in the shuttle mode may be received and processed; and, when calculating the preference order of the at least two elevators in the shuttle mode, only those of the at least two elevators in the shuttle mode may be considered where the number of persons already waiting is smaller than a preset limit number;

when calculating the preference order of the at least two elevators in the shuttle mode, the time required by the user for reaching each of the at least two elevators in the shuttle mode from the operation terminal location may be subtracted from the time of arrival and/or departure of the elevator car of each of the at least two elevators in the shuttle mode, wherein the smaller the difference value resulting from the subtraction, the higher the rank of each of the at least two elevators in the shuttle mode in the preference order is;

when the difference value resulting from the subtraction is smaller than a predetermined value, the corresponding elevator may be cancelled from the preference order or starting a processing for changing at least one of a color and contrast setting used for the display mode;

a crowdedness factor for the predetermined floor may be determined, wherein the crowdedness factor defines a number of persons being present in the predetermined floor, and a distance between each of the at least two elevators in the shuttle mode and the operation terminal location may be determined, wherein, when calculating the preference order of the at least two elevators in the shuttle mode, the crowdedness factor and the distance may be considered as weighting factors, wherein the higher the crowdedness factor, the higher the weighting factor of the distance between each of the at least two elevators in the shuttle mode and the operation terminal location is, wherein the weighting factor for the distance is higher when the distance is shorter;

a status of elevator operation of each of the at least two elevators in the shuttle mode may be determined, and the display mode may be adapted according to the determined status;

each of the plurality of display modes may include a specific setting for at least one of a display location of an elevator identification indication on a screen, a dimension of the elevator identification indication, a static contrast of the elevator identification indication, a changeable contrast of the elevator identification indication, a static color of the elevator identification indication, a changeable color of the elevator identification indication, and an indication of a status of elevator operation, wherein a first display mode having a first setting may be assigned to that of the at least two elevators in the shuttle mode having the highest rank in the preference order, and at least one second display mode having a setting being different to the first setting may be assigned to the others of the at least two elevators in the shuttle mode.

Furthermore, according to an example of an embodiment, there is provided, for example, an elevator system including a plurality of elevators, wherein at least two of the plurality of elevators are set into a shuttle mode in which the corresponding elevator travels between two pre-defined floors; at least one operation terminal including a display for displaying information related to the at least two elevators in the shuttle mode; a controller configured to calculate at least one of an arrival time and a departure time of an elevator car of each of the at least two elevators in the shuttle mode at a predetermined floor; determine a time required by a user for reaching each of the at least two elevators in the shuttle mode from the location of the at least one operation terminal; calculate a preference order of the at least two elevators in the shuttle mode on the basis of the time of arrival and/or departure of the elevator car of each of the at least two elevators in the shuttle mode and the time required by the user for reaching each of the at least two elevators in the shuttle mode from the operation terminal location; and assign one of a plurality of display modes to each of the at least two elevators in the shuttle mode according to the preference order, wherein the at least one operation terminal is further configured to display an elevator identification of the at least two elevators in the shuttle mode according to the preference order and the assigned display mode.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
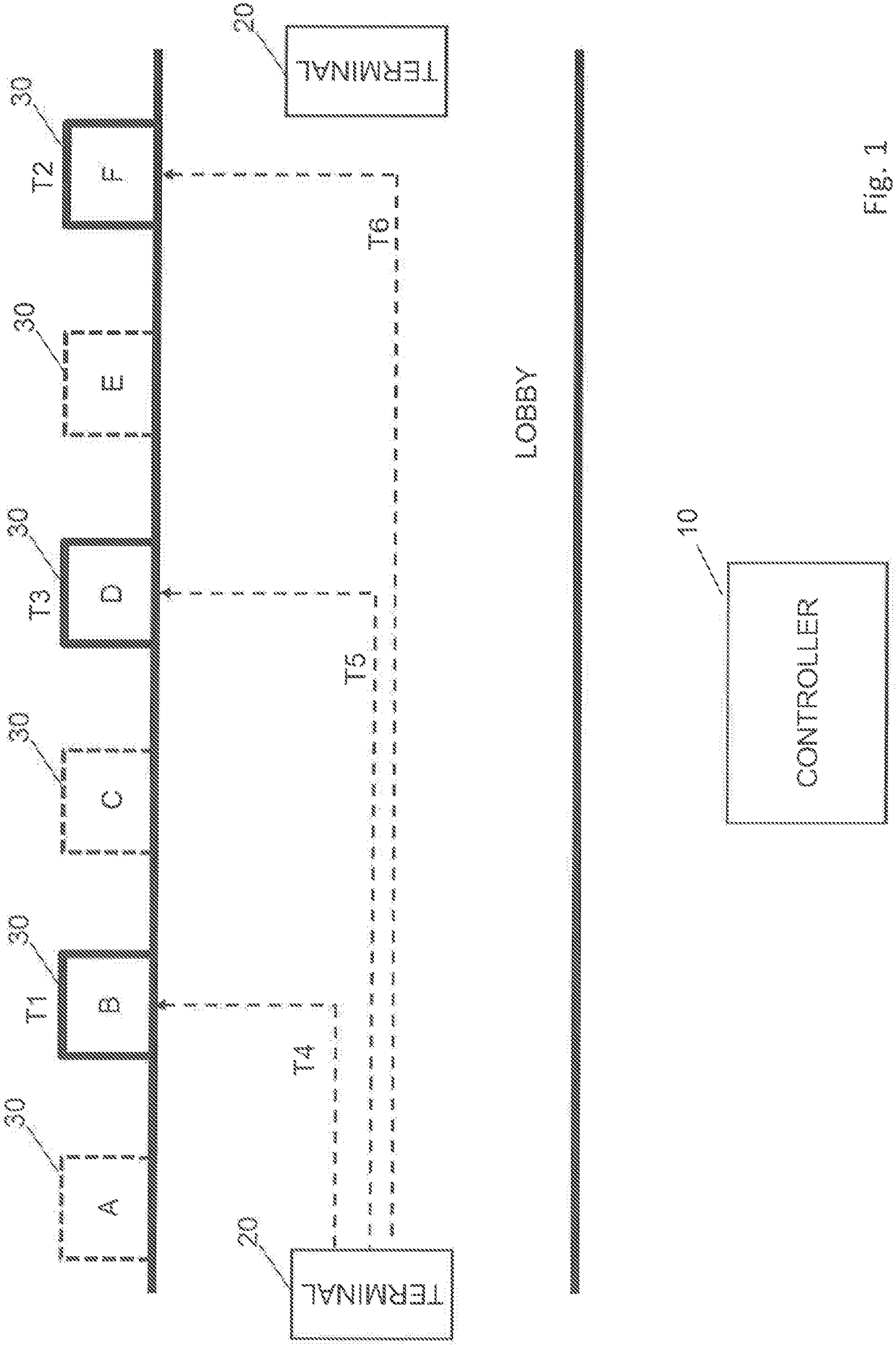
FIG. 1 shows a schematic diagram illustrating a configuration of an elevator system where some examples of embodiments are implementable.

In the following, different exemplifying embodiments will be described using, as an example of an elevator system to which the embodiments may be applied, an elevator system as depicted and explained in connection with FIG. 1. However, it is obvious for a person skilled in the art that principles of embodiments may also be applied to other kinds of elevator systems or lifts having different types of driving units, such as electric elevator systems, hydraulic elevator systems, rack and pinion elevator systems, and the like, wherein a plurality of landings (i.e. two or more floors) are reachable by one or more elevators in a corresponding number of elevator shafts. That is, examples of embodiments of the invention are applicable to a wide range of different kinds of elevator systems, such as traction elevators, winding elevators, hydraulic elevators, as well as to different kinds of suspension/roping configurations.

It is to be noted that the following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

The general elements and functions of described elevator systems, details of which also depend on the actual type of elevator system, are known to those skilled in the art, so that a detailed description thereof is omitted herein. However, it is to be noted that several additional devices and functions besides those described below in further detail may be employed in an elevator system.

Furthermore, elevator system elements, in particular operation elements, control elements or sensors, as well as corresponding functions as described herein, and other elements, functions or applications may be implemented by using software, e.g. by a computer program product for a computer, and/or by hardware. For executing their respective functions, correspondingly used devices, elements or functions may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means etc.) and the like. It is to be noted that in the present specification processing portions should not be only considered to represent physical portions of one or more processors, but may also be considered as a logical division of the referred processing tasks performed by one or more processors.

FIG. 1 shows a schematic diagram illustrating a configuration of an elevator system where some examples of embodiments are implementable. It is to be noted that examples of embodiments are not limited to an elevator system structure with the numbers and types of elevators or operation terminals as shown in FIG. 1. Rather, the numbers and types of elevators or operation terminals, corresponding functions, and structures may be different to that indicated in FIG. 1, i.e. there may be implemented or present more (or less) of the corresponding elevators or operation terminals than those shown in FIG. 1.

In FIG. 1, a floor plan of an elevator lobby area of a building is schematically shown. Reference signs 30 denote respective elevators (i.e. a corresponding elevator car and shaft), which allow to travel between different floors of the building. In the example of FIG. 1, six elevators A to F are shown. Each of the elevators can be individually controlled and driven, but it is also possible to combine two or more of the elevators A to F into an elevator group acting in a coordinated manner. The range of the elevators A to F may be the same, i.e. all elevators reach to the same floor, or different to each other, i.e. one or more of the elevators reach only lower floors than others of the elevators.

Reference signs 20 denote operation terminals or DOPs. The operation terminals 20 are located at fixed sites in the elevator lobby, for example, at entry points of the lobby area, or adjacent to one or more (all) of the elevators 30. The operation terminals 20 are usable, for example, in a destination call elevator system implementation and allow users to call for an elevator car towards a desired destination, e.g. by means of a corresponding input means such as a keyboard, a button and/or a transceiver system (in case of using an RFID card and the like). Furthermore, a display like a screen or the like is provided in order to provide information to the user, such as an indication of an identification (ID) of a specific one of the elevators 30 (i.e. an elevator ID, such as "A" to "F"). It is to be noted that the number of operation terminals being applicable in examples of embodiments of the invention is not limited to that indicated in FIG. 1. For example, one or three or more terminals 20 may be provided at different locations.

Furthermore, also a divided configuration of the operation terminal is applicable, i.e. the display is provided at a different location than the input means (e.g. a central display screen and a separated call button or terminal, or the like).

Reference sign 10 denotes a controlling device which represents a part of a elevator control subsystem and is used for monitoring the operation of the elevators 30 and for providing information to the user via the display of the operation terminal 20.

It is to be noted that the elevator system shown in FIG. 1 may include additional parts besides those shown in FIG. 1, which may be usable for at least some examples of embodiments of the invention. For example, one or more sensors may be provided which allow to detect persons in the lobby, such as a video system, weight sensors or the like, by means of which a number of passengers waiting for one or more of the elevators can be determined.

Figure 2:
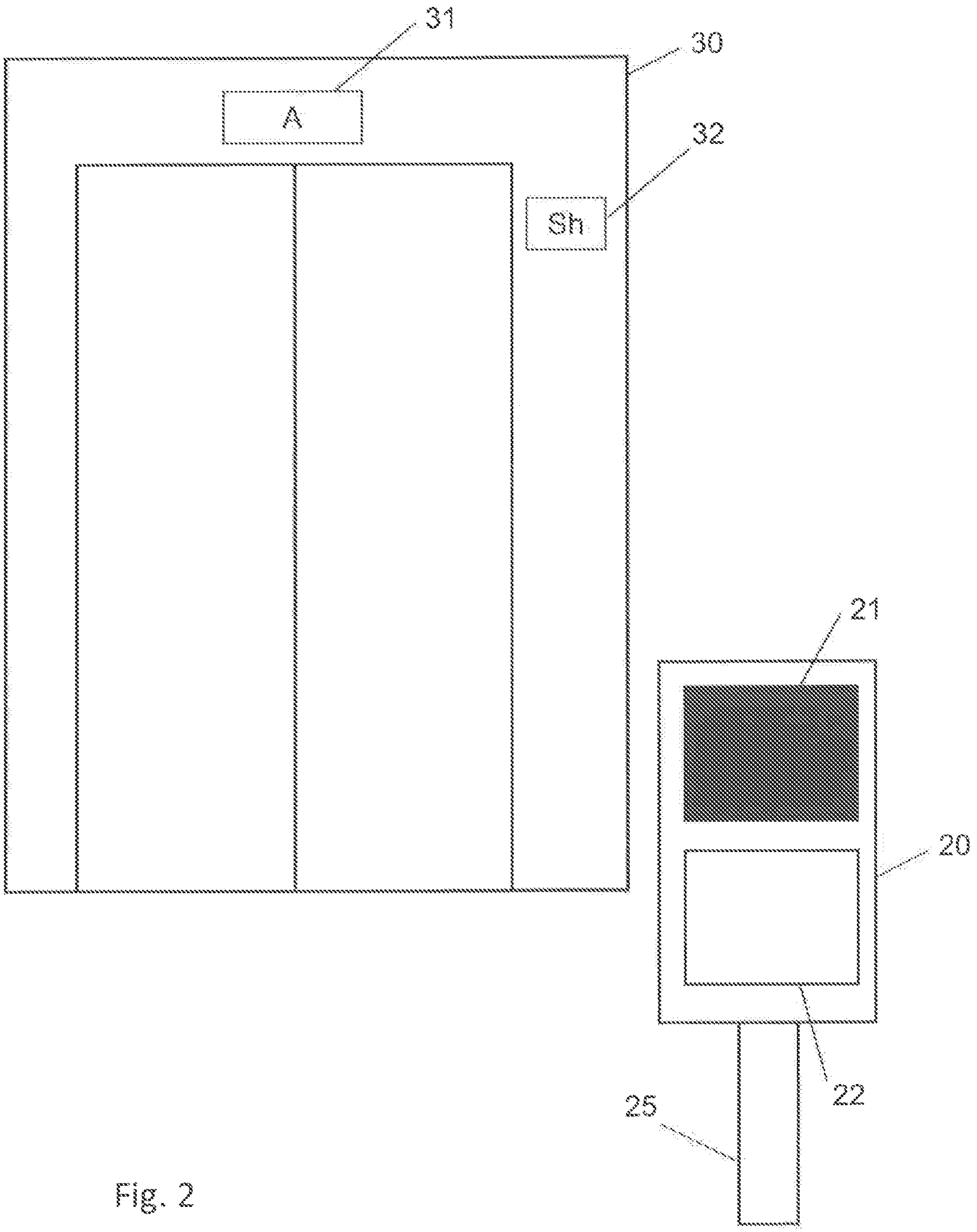
FIG. 2 shows a diagram illustrating details of a configuration of an elevator system where some examples of embodiments are implementable.

FIG. 2 shows a diagram illustrating details of a configuration of an elevator system like that shown in FIG. 1 where some examples of embodiments are implementable.

Specifically, FIG. 2 shows one of the elevators 30 and an operation terminal 20 which is located on a site in the lobby on a corresponding support 25 to be operable by a user in a comfortable manner.

At the elevator entry (indicated by doors in FIG. 2), an elevator ID 31 (here elevator ID "A") is provided for allowing a correct identification of each of the elevators. Reference sign 32 denotes a destination indication display. For example, the destination indication display shows the floor to which the elevator car travels. Alternatively or additionally, it is also possible that the destination indication display shows an information indicating the operation mode of the elevator 30, e.g. a shuttle mode (by means of "Sh" or the like).

In the operation terminal 20, a display means 21 and an operation input means 22 are shown. The display means 21 is for example a LCD (liquid crystal display) or the like which allows to display various information pieces on the display. The operation input means 22 includes, for example, a keyboard, a card reader, buttons and the like which allow the user to input, for example, a destination to which he wishes to go by means of the elevator 30.

As indicated above, a shuttle mode is used e.g. during peak traffic hours in the building. In the example shown in FIG. 1, it is assumed, for example, that elevators B, D and F are set into the shuttle mode and travel only between two pre-defined floors. Conventionally, the operation terminal 20 shows the elevator being in the shuttle mode.

However, when e.g. a large number of elevators is available in the whole lobby, a walking distance between the operation terminal 20 and a corresponding elevator car may be large as well, so that there is required a specific amount of time for an average passenger to reach the elevator. This time required to reach the elevator represents also the time the passenger is present in the lobby, which is to be considered for a crowdedness factor to be described later.

In FIG. 1, the distance (and hence the time necessary to reach the elevator and/or the passenger is in the lobby) is indicated by corresponding dashed arrows from the left-side operation terminal 20 to each of the elevators B, D, F in the shuttle mode, wherein the different times are indicated by T4, T5 and T6, respectively. The times may be determined, for example, by experiments or calculated by using an assumed walking speed of an average user and the measured distance between the terminal and the elevator door.

As a consequence of the required times T4 to T6, it is not sure that each passenger reaches the elevator in time, e.g. in case the elevator car is already at this floor and intends to start traveling to the other floor in the shuttle mode. Hence, the user may miss the leaving elevator and has to go back to the operation terminal 20 in order to check the next shuttle elevator car leaving. This increases also a crowdedness factor in the lobby, as the user remains unnecessarily in the lobby.

In order to overcome this, according to examples of embodiments of the invention, measures for improving the efficiency of using an elevator system such as that shown in FIG. 1 and the user experience when using such an elevator system by avoiding a situation where the elevator in shuttle mode can not be reached in time are provided. In addition, measures are proposed allowing to reduce the number of persons being present in the lobby by suitably directing them to an elevator in shuttle mode, which is useful for example in case of peak times of elevator usage, Specifically, according to some examples of embodiments, the operation terminal 20 (or a correspondingly usable display means) is configured to display a plurality of indications of elevators (e.g. up to three elevators) in the shuttle mode which are leaving in the next time. The order of display of the elevators is set in such a manner that a walking distance and/or the required time between the location where the display can be watched (e.g. the location of the operation terminal 20) and the entry to the elevator car of the corresponding elevator in the shuttle mode is considered. Hence, the system is configured to show the user all of the next leaving elevators in a suitable order, wherein the order of the shown elevators can be set in a suitable manner according to weighting factors or the like (to be described later). For example, if the time required to reach the first shown elevator is not sufficient (or deemed to be not sufficient), the user can directly decide to head for another elevator without making another call. On the other hand, the system is able to direct people flow in the lobby in such a manner that the pedestrian traffic in the lobby can be reduced, which is in particular effective in a peak or rush period.

That is, according to some examples of embodiments, the operation terminal 20 shows e.g. the three next departures or arrivals of elevators in the shuttle mode by indicating a corresponding elevator ID. For example, as indicated in FIG. 1, a departure (or arrival) time T1 is assumed for elevator "B", a departure (or arrival) time T2 is assumed for elevator "F", and a departure (or arrival) time T3 is assumed for elevator "D". The order of display and a form of display of the corresponding elevator ID (which is also referred to as display mode) being used is set in accordance with this departure (arrival) time and a parameter representing the different walking times from the current location of the user (i.e. the operation terminal location) to the respective door of the elevator in question (i.e. T4 to T6 in FIG. 1). On this basis, a preference order of the elevators being in the shuttle mode is calculated which in turn is used for determining the order and form of display of the elevator IDs.

For example, the elevator providing the shortest time period until departure (i.e. the shortest time available for walking for the user) is shown on a leftmost side of the display, while the elevator providing the longest time period until departure (i.e. the shortest time available for walking for the user) is shown on the rightmost side of the display. Elevators providing intermediate results may be shown between these two extremes.

According to further examples of embodiments, the display mode may consider also different states of the corresponding elevator. For example, when it is assumed that there is not enough walking time for the user from the operation terminal, e.g. since the elevator is about to close the doors for departure in the near future and the distance is too large for reaching this elevator in a usual time, the indication of the corresponding elevator ID may be changed in color or contrast, e.g. it may fade away. Furthermore, in case an elevator is currently approaching this floor and about to open the door for allowing access to its interior, an indication of the elevator ID may be changed accordingly, e.g. by means of an animated icon simulating opening doors or the like.

Thus, it is easier for passengers to get in the elevators during peak traffic hours, and the passengers can easily see from the terminal display which elevators are the next leaving elevators.

According to some further examples of embodiments, the elevator system and hence the control method implemented therein is configured to consider additional factors in the indication at the operation terminal. For example, in case of a period of time where the number of people (or users of the elevator system) is high, which is also referred to as peak time or rush time, it is not only considered that the user reaches the elevator being in shuttle mode in due time, but also to direct the flow of people in the lobby in a suitable manner.

For example, assuming a situation in FIG. 1 where a user is at the left sided terminal 20, and the next available elevator being in shuttle mode would be elevator "F". However, in this case, the distance to be passed by the user is great. Hence, the time the user remains in the lobby as a walking person would be comparable long. When it is currently a peak time with many people in the lobby, the crowdedness level (also referred to as crowdedness factor) representing a scale unit for the number of persons in the lobby remains high or is even increased, since the user is walking through the whole lobby. In case the crowdedness factor is too high, problems in traffic guidance may arise, and the user experience is deteriorated. Furthermore, when the crowdedness factor is too high, the calculation basis for the time required to reach a specific elevator may be changed, e.g. since a user has problems to pass the high number of persons.

In such a situation, according to some examples of embodiments, additional measures are taken allowing to reduce (or at least not increase) the crowdedness factor, wherein the user is guided to an elevator in shuttle mode being as close as possible to the present position of the user.

For example, in a corresponding control procedure, a crowdedness factor for lobby (i.e. the predetermined floor for which the operation panel is provided) is determined for determining what number of persons being present in the predetermined floor. For example, the determination of the crowdedness factor is based on a rush hour period which may be a period of day designated as having a high number of persons in the lobby; this is based e.g. on statistics. Alternatively or additionally, real-time based measurements may be used for determining the crowdedness factor, e.g. by using access data received from a building access control system or the like.

Furthermore, the distance between each of the elevators in the shuttle mode and the operation terminal location is acquired, e.g. from a database or from stored data. As the distance between the operation terminal and the elevators is required for determining the time required to reach the elevator, corresponding data are usually present. The distance is of relevance since it influences the time the user is walking and hence present in the lobby, which contributes to the crowdedness factor.

In case the crowdedness factor is high, for example exceeds a predetermined threshold value, the preference order for the indication of the elevators in the shuttle mode is calculated by considering the crowdedness factor as a weighting factor. As one example, when the threshold value is exceeded, meaning that a peak time is reached, the preference order considers the distance between the elevator in shuttle mode and the operation terminal. For example, in the example being described above (based on FIG. 1), even if the elevator "F" would be the elevator being reachable by the user in time, the preference order being shown indicates another elevator, e.g. elevator "B", as the most preferable elevator since the distance is shorter. Consequently, according to further examples of embodiments, the calculation of the preference order considers the distance between the operation terminal and the elevators in question as a weighting factor, when the crowdedness factor is to be considered, and indicates the elevator being closest to the operation terminal, for example.

It is to be noted that the calculation of the preference order is flexible. For example, the crowdedness factor may be used as a trigger for switching to a calculation mode using the shorter distanced elevator as the preferred elevator (i.e. when the threshold value is reached, the distance dominates the preference order). Alternatively, the weighting factor based on the crowdedness factor is gradually increased, based on the magnitude of the crowdedness factor (i.e. the higher the crowdedness factor, the higher the influence of the distance to the preference order is).

Furthermore, also the time of departure of the respective elevators can be still considered, even if the preference order is dominated by the distance. For example, in case the elevator "B" in the shuttle mode which is the closest one to the operation terminal 20 has just left and would therefore require a long waiting time, a long time period of presence of the user in the lobby would be the result, and hence the crowdedness factor is increased. In this case, another elevator (e.g. elevator "D"), even though being farther away than elevator "B", would be a better choice as the user could leave the lobby earlier. Consequently, according to further examples of embodiments, the calculation of the preference order considers the distance between the operation terminal and the elevators in question and also the departure time of the respective elevators as weighting factors, when the crowdedness factor is to be considered.

In other words, when the crowdedness factor is to be considered, e.g. for guiding the passenger traffic in the lobby in a suitable manner, the higher the crowdedness factor, the higher the weighting factor of the distance between each of the at least two elevators in the shuttle mode and the operation terminal location is, wherein the weighting factor for the distance is higher when the distance is shorter.

It is to be noted that in case more than one operation terminal is provided in the lobby, according to examples of embodiments, each terminal display shows a corresponding indication of elevator IDs in an order being adapted to the location of the operation terminal. For example, in the example of FIG. 1, when considering the operation terminal 20 on the right side, depending on the relationship between a corresponding walking time and departure/arrival time of the elevators B, D and F, the display content may be different to that of the operation terminal on the left side.

Figure 3:
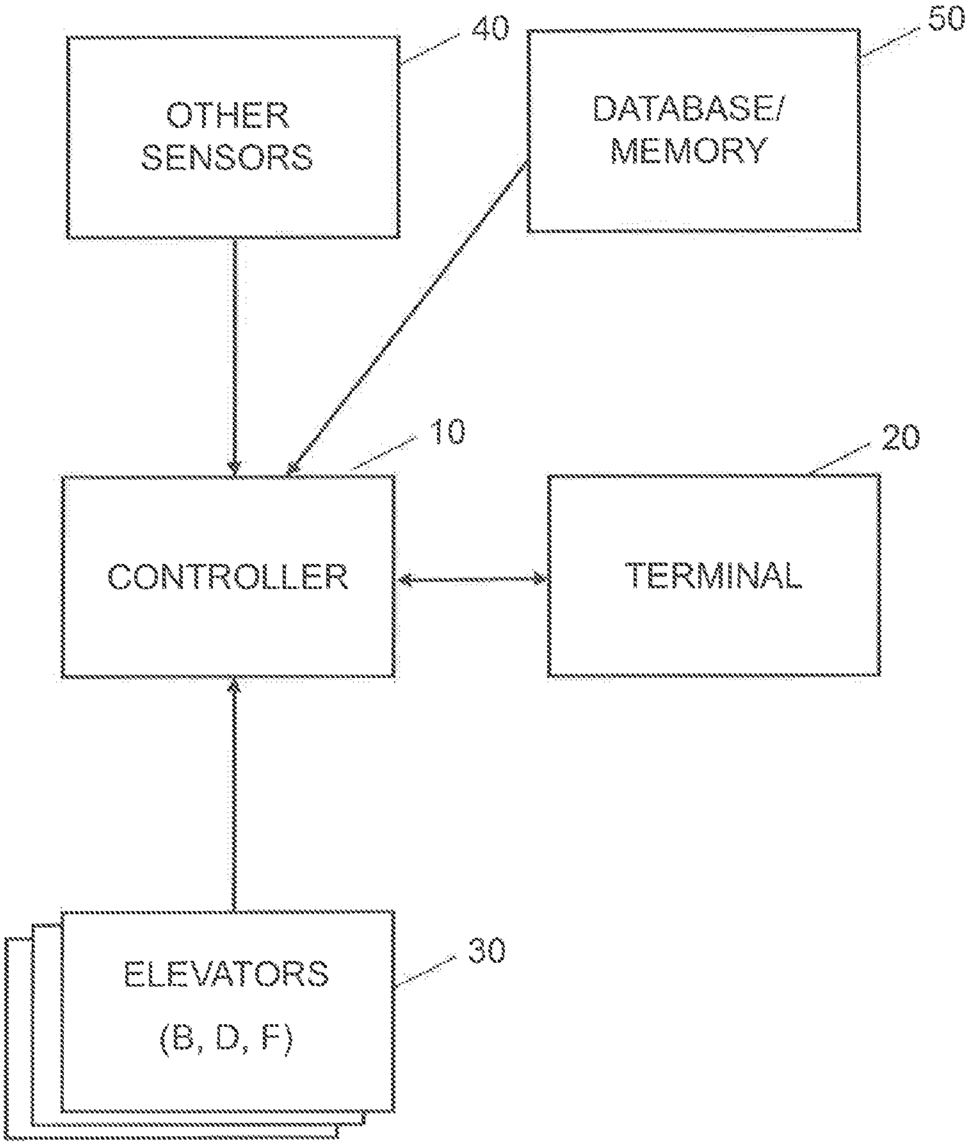
FIG. 3 shows a block circuit diagram of a configuration of an elevator monitoring system according to some examples of embodiments.

FIG. 3 shows a block circuit diagram of a configuration of an elevator monitoring system according to some examples of embodiments.

The elevator monitoring system shown in FIG. 3 comprises a control element or function (controller) 10 which is in charge of conducting the required processing for monitoring elevator operations and providing contents for the display on the operation terminals 20. For this purpose, the controller 10 is connected to each of the elevators 30 for obtaining data at least for the elevators in shuttle mode. The data includes, for example, location and drive information of the elevator cars in order to determine an arrival time at the elevator lobby, status signals such as door opening or closing operation, load information indicating the load condition of the elevator car, and the like. Corresponding data may be provided, for example, from control parts of the respective elevator, or derived from operation related signaling, and transmitted to the controller 10 via a suitable link, such as controller area network (CAN), a wireless (e.g. radio) connection, and the like.

The controller 10 is further connected to the operation terminals 20, for example by means of a suitable link like a controller area network (CAN), a wireless (e.g. radio) connection, and the like. The controller 10 sends data to the operation terminal 20 for displaying information, such as data regarding the elevators in shuttle mode. On the other hand, data may be sent from the operation terminal 20 to the controller 10, such as destination request data, identification data of a user used for determining a desired destination, and the like.

Reference sign 40 denotes one or more sensors provided in the elevator lobby, which are connected to the controller 10 controller e.g. via an area network (CAN), a wireless (e.g. radio) connection, and the like. The sensors 40 may include a variety of sensor types usable for detecting and recognizing persons or a number of persons in the elevator lobby and/or in specific areas of the elevator lobby, such as video sensors (cameras), infrared sensors, radar sensors, weight sensors in the floor ground, and the like. Data from the sensors 40 may be processed by the controller 10 as a further factor in the calculation of the preference order, as described below.

Reference sign 50 denotes a database or memory which is connected to the controller 10 via a controller area network (CAN), a wireless (e.g. radio) connection, and the like. The database 50 stores, for example, settings for a shuttle mode, such as destination settings for the shuttle mode (i.e. start floor and end floor), time interval settings for shuttle mode (e.g. pre-set standing time at a floor), elevator car configuration data (size/capacity of elevator car etc.), elevator grouping information (e.g. which elevators are set in shuttle mode) and the like. The data are transmitted to the controller 10 for using them in the calculation of the preference order, for example.

Next, examples of embodiments of the invention related to operations of the elevator monitoring system described above with regard to FIGS. 1 to 3 are described, wherein reference is also made to FIGS. 4*a* to 4*d* which show examples of displays on an operation terminal according to some examples of embodiments.

As a first configuration example, it is assumed that there is a preset number of elevators being in shuttle mode (e.g. three elevators from a total of six elevators, such as elevators B, D and F in FIG. 1, wherein each elevator in shuttle mode connects the same two floors, such as ground floor and $10^{th}$ floor, for example) and one operation terminal (e.g. the left terminal 20 in FIG. 1) is provided. The controller 10 calculates, for example, a departure time T1 to T3 of each of the three elevators in shuttle mode, for example by adding the time from the current location of the elevator car to the elevator lobby (which corresponds to the arrival time) and the time interval being set as standing time at the elevator lobby. Then, the time required by a user from the operational terminal to the respective entry of the elevators B, D and F is determined, e.g. on the basis of stored information achieved by experiments, or the like, which is represented by T4 to T6. Then, the preference order of the elevators B, D, F is calculated, e.g. by subtracting T4 from T1, by subtracting T5 from T3 and by subtracting T6 from T2. The smaller the resulting difference, the higher the rank in the preference order is. As a matter of course, the system considers positive results for the difference, since a negative result would indicate that the departure time is before the elevator can be reached. For example, the result of the preference order calculation is that elevator B arrives at first and can be reached by the user in a suitable time, while elevator F is arriving thereafter and can be reached in a suitable time (even though it is farthest away). Elevator D is determined to reach the elevator lobby as the last one and has hence the lowest rank in the preference order.

Figure 4A:
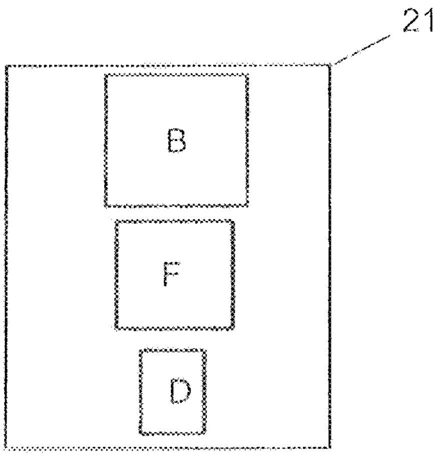
FIGS. 4*a* to 4*d* show examples of displays on an operation terminal according to some examples of embodiments.

The result of the preference order calculation is displayed on the operation terminal 20 (i.e. the display means 21) in a manner as shown, for example, in FIG. 4*a*. Specifically, a corresponding display mode is assigned to each elevator B, D, F according to its rank in the preference order. The display mode defines, for example, a position of the elevator ID on the display screen and a size of the elevator ID. As indicated in FIG. 4*a*, the elevator having the highest rank (i.e. elevator B) is displayed on the uppermost position and with a size being the largest one, compared to the other ones. Elevator F is shown in a middle position with an intermediate size, while elevator D is shown on the lowermost position with the smallest size. Alternatively, the positons may be arranged in a lateral direction (the highest ranked elevator on the leftmost position etc.) or the sizes may be replaced by different colors (e.g. red, yellow and green or the like, with red being used for the highest ranked elevator).

Similar to the first configuration example, in a second configuration example, it is assumed that there is a preset number of elevators being in shuttle mode (e.g. three elevators from a total of six elevators, such as elevators B, D and F in FIG. 1), but more than one operation terminal, for example two terminals (the left and right terminals 20 in FIG. 1) are provided. The controller 10 calculates again the departure times T1 to T3 of each of the three elevators in shuttle mode. Then, the time required by a user from the each of the operational terminals 20 to the respective entry of the elevators B, D and F is determined, e.g. on the basis of stored information achieved by experiments, or the like (of which only T4 to T6 for the left terminal are shown). Then, the preference order of the elevators B, D, F is calculated for each of the terminals 20, e.g. by subtracting the respective times required by the user from the departure times. Again, the smaller the resulting difference, the higher the rank in the preference order for the corresponding terminal 20 is. The results of the preference order calculations are then displayed on the corresponding operation terminal 20 (i.e. the display means 21) in a manner as shown, for example, in FIG. 4*a* (with possibly different orders, depending on the result of the preference order calculation). Furthermore, in case it is determined that the elevator becomes unreachable for the users, the elevator ID is discarded or cancelled from the display screen, and a new display content is obtained by calculating a new preference order of elevators.

Figure 4B:
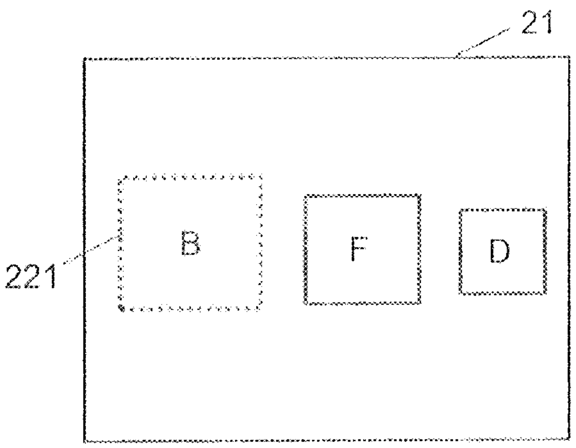

A third configuration example, which is illustrated in FIG. 4*b*, is based e.g. on the first or second configuration example. Here, the display mode is supplemented by a feature that the indication of the elevator IDs is changed when it is determined that the user may not be able to reach the corresponding elevator in due time. For example, the controller monitors the state of the elevators constantly, and when it is determined that the result of the subtraction of the time required by the user (e.g. time T4) from the time of departure of the elevator (e.g. elevator B's time T1) is equal to or smaller than a preset threshold (e.g. equal to the time T4 plus a constant time factor), it is assumed that the user may not be able to reach the elevator in question in a suitable manner.

This is indicated by changing the display of the elevator ID 221 (e.g. "B" in FIG. 4*b*), e.g. by fading away (contrast change), by blinking or by other color change. In other words, the display modes of the elevator IDs are adapted to a changing status of the corresponding elevators.

Figure 4C:
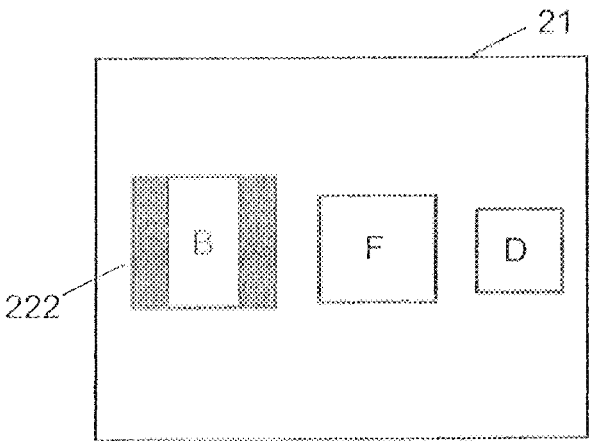

A fourth configuration example, which is illustrated in FIG. 4*c*, is based e.g. on any of the first to third configuration examples. Here, the display mode is supplemented by a feature that the indication of the elevator IDs is changed when it is determined that the elevator car is approaching the elevator lobby floor and/or begins to open the doors. For example, the controller monitors the state of the elevators constantly, and when it is determined that the elevator car is about to open the access to its cabin, this is indicated by changing the display of the elevator ID (e.g. "B" in FIG. 4*c*), e.g. adding an animation 222 of an opening door or the like. In other words, the display modes of the elevator IDs are adapted to a changing status of the corresponding elevators.

Figure 4D:
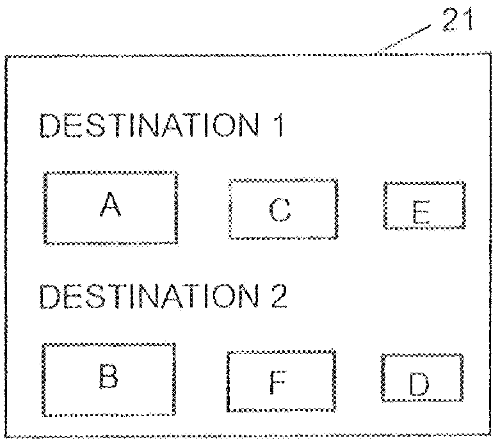

A fifth configuration example, which is illustrated in FIG. 4*d*, is based e.g. on any of the first to fourth configuration examples. Here, it is assumed that more than one destination is used for the shuttle mode. For example, one group of elevators is used for a shuttle mode to a first destination (e.g. ground floor and 10$^{th}$ floor), which could be represented by elevators B, D and F, while another group of elevators, which could be represented, for example, by elevators A, C and E in FIG. 1, is used for a shuttle mode to a second destination (e.g. ground floor and 20$^{th}$ floor). It is to be noted that in such a case more than six elevators may be present in order to keep a number of elevators available for standard operation mode, for example. The controller 10 calculates a departure time of each of the elevators in shuttle mode of the respective group, and determines the time required by a user from the corresponding operational terminal to the respective entry of each of the elevators Then, the preference order of the elevators of each group (i.e. elevators B, D, F for destination 2 and elevators A, C, E for destination 1) is calculated, e.g. in a manner as described above The result of the preference order calculation is then displayed on the operation terminal 20 (i.e. the display means 21) in a manner as shown, for example, in FIG. 4*d*, i.e. each group of elevators for each destination is indicated correspondingly.

It is to be noted that in case the preference order is determined on the basis of the distance between the operation terminal 20 and the elevators, the result of the preference order calculation is displayed on the operation terminal 20 (i.e. the display means 21) in an adapted manner.

Furthermore, it is to be noted that also other configuration examples can be implemented in addition to the above configuration examples.

For example, additional measures for guiding the traffic of passengers can be implemented. In this context, data achieved from the other sensors 40 shown in FIG. 3 may be used for determining a number of passengers already waiting at an entrance point for a specific elevator. In case the number of waiting passengers is higher than a preset threshold value, it can be assumed that new passengers will not find a place in this elevator, due to a capacity limit. Hence, instead of indicating this elevator in operation terminal 20, the corresponding ID is suppressed or discarded in the current calculation of the preference order, and another elevator ID is displayed on the position of the highest rank in the preference order.

Furthermore, data input at the operation terminal 20 (i.e. at the input means 22) can be considered when displaying the recommended elevators. For example, in case the user manually inputs a desired destination (e.g. by keyboard input) or identifies himself by an RFID card or the like (from which it is determined to which destination the user belongs), a correct group of elevators in shuttle mode can be selected for being displayed on the operation terminal. For example, instead of displaying all shuttle groups with a corresponding destination as shown in FIG. 4*d*), the operation terminal 20 is caused to display only the selected group of elevators in shuttle mode. This may be useful, for example, when a plurality of access gates with respective operation terminals is provided for accessing the elevator lobby, or the like, where each user can obtain a personalized recommendation for suitable elevators.

Figure 5:
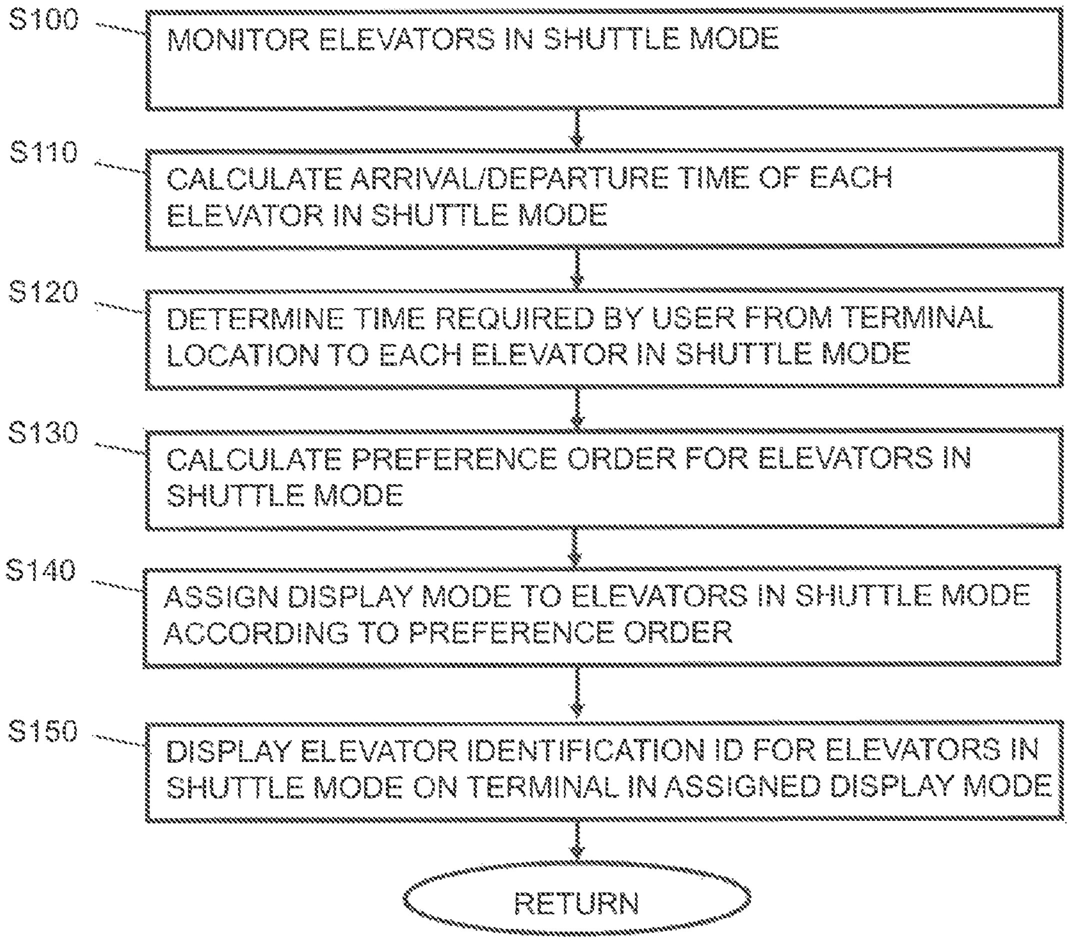
FIG. 5 shows a flow chart of a processing conducted in a control device of an elevator monitoring system according to some examples of embodiments.

FIG. 5 shows a flow chart of a processing conducted in a in a control device of an elevator monitoring system according to some examples of embodiments. Specifically, the example according to FIG. 5 is related to a procedure conducted by the controller 10 of FIG. 3 when being used in an elevator system as depicted in FIG. 1.

In S100, a plurality of elevators is monitored, wherein at least two of the plurality of elevators are set into a shuttle mode in which the corresponding elevator travels between two pre-defined floors.

In S110, at least one of an arrival time and a departure time of an elevator car of each of the at least two elevators in the shuttle mode at a predetermined floor (e.g. the floor level where the elevator lobby is located) is calculated. This is done by using data received from each elevator, for example. For example, a departure time of an elevator car of each elevator in the shuttle mode is calculated by adding an arrival time and an estimated stop time period.

In S120, a time required by a user for reaching each of the elevators in the shuttle mode from an operation terminal location is determined. According to some examples of embodiments, when there is a plurality of operation terminals placed at different locations, the time required by the user for reaching each of the at least two elevators in the shuttle mode is determined for each of the operation terminals separately. Then, when a preference order of the elevators in the shuttle mode is calculated, a preference order is calculated for each of the plurality of operation terminals.

In S130, the preference order of the elevators in the shuttle mode is calculated on the basis of the time of arrival and/or departure of the elevator car of each of the elevators in the shuttle mode and the time required by the user for reaching each of the elevators in the shuttle mode from the operation terminal location(s).

In the calculation of the preference order, according to some examples of embodiments, a request for a specific destination of an elevator transport is received and processed (e.g. by user manual input or ID card data). This is considered when calculating the preference order of the at least two elevators in the shuttle mode, i.e. only those of the elevators in the shuttle mode traveling to the requested destination are used.

Alternatively or additionally, according to some examples of embodiments, additional information related to a number of persons already waiting for each of the elevators in the shuttle mode is received and processed (e.g. from sensors 40). When calculating the preference order of the elevators in the shuttle mode, only those of the elevators in the shuttle mode are considered for the preference order (or the display) where the number of persons already waiting is smaller than a preset limit number (e.g. capacity limit based).

Alternatively or additionally, according to some examples of embodiments, when the preference order of the elevators in the shuttle mode is calculated, the time required by the user for reaching each of the elevators in the shuttle mode from the operation terminal location(s) is subtracted from the time of arrival and/or departure of the elevator car of each of the at least two elevators in the shuttle mode. The rank of an elevator in the preference order is set in accordance with a corresponding result, i.e. the smaller the difference value resulting from the subtraction, the higher the rank of each of the at least two elevators in the shuttle mode in the preference order is. Furthermore, according to some examples of embodiments, when the difference value resulting from the subtraction is smaller than a predetermined value, the corresponding elevator is cancelled from the preference order, or a processing for changing at least one of a color and contrast setting used for a display mode of this elevator is changed.

Alternatively or additionally, according to some examples of embodiments, a crowdedness factor for the predetermined floor is determined, wherein the crowdedness factor defines a number of persons being present in the predetermined floor. In addition, a distance between each of the at least two elevators in the shuttle mode and the operation terminal location is determined. Then, when the preference order of the at least two elevators in the shuttle mode is calculated, the crowdedness factor and the distance are considered as weighting factors, wherein the higher the crowdedness factor, the higher the weighting factor of the distance between each of the at least two elevators in the shuttle mode and the operation terminal location is, wherein the weighting factor for the distance is higher when the distance is shorter.

In S140, one of a plurality of display modes is assigned to each of the elevators in the shuttle mode according to the preference order. For example, according to some examples of embodiments, a status of elevator operation of each of the at least two elevators in the shuttle mode is determined (e.g. start of departure, start of opening the door, etc.), wherein the display mode is adapted according to the determined status.

According to some examples of embodiments, each of the plurality of display modes includes a specific setting for at least one of a display location of an elevator identification indication on a screen, a dimension of the elevator identification indication, a static contrast of the elevator identification indication, a changeable contrast of the elevator identification indication, a static color of the elevator identification indication, a changeable color of the elevator identification indication, and an indication of a status of elevator operation. A first display mode having a first setting is assigned to that of the elevators in the shuttle mode having the highest rank in the preference order. Other display modes having another setting than the first setting are assigned to the others of the elevators in the shuttle mode.

In S150, display of the elevator identification according to the preference order by using the assigned display mode is caused on the operation terminal.

Figure 6:
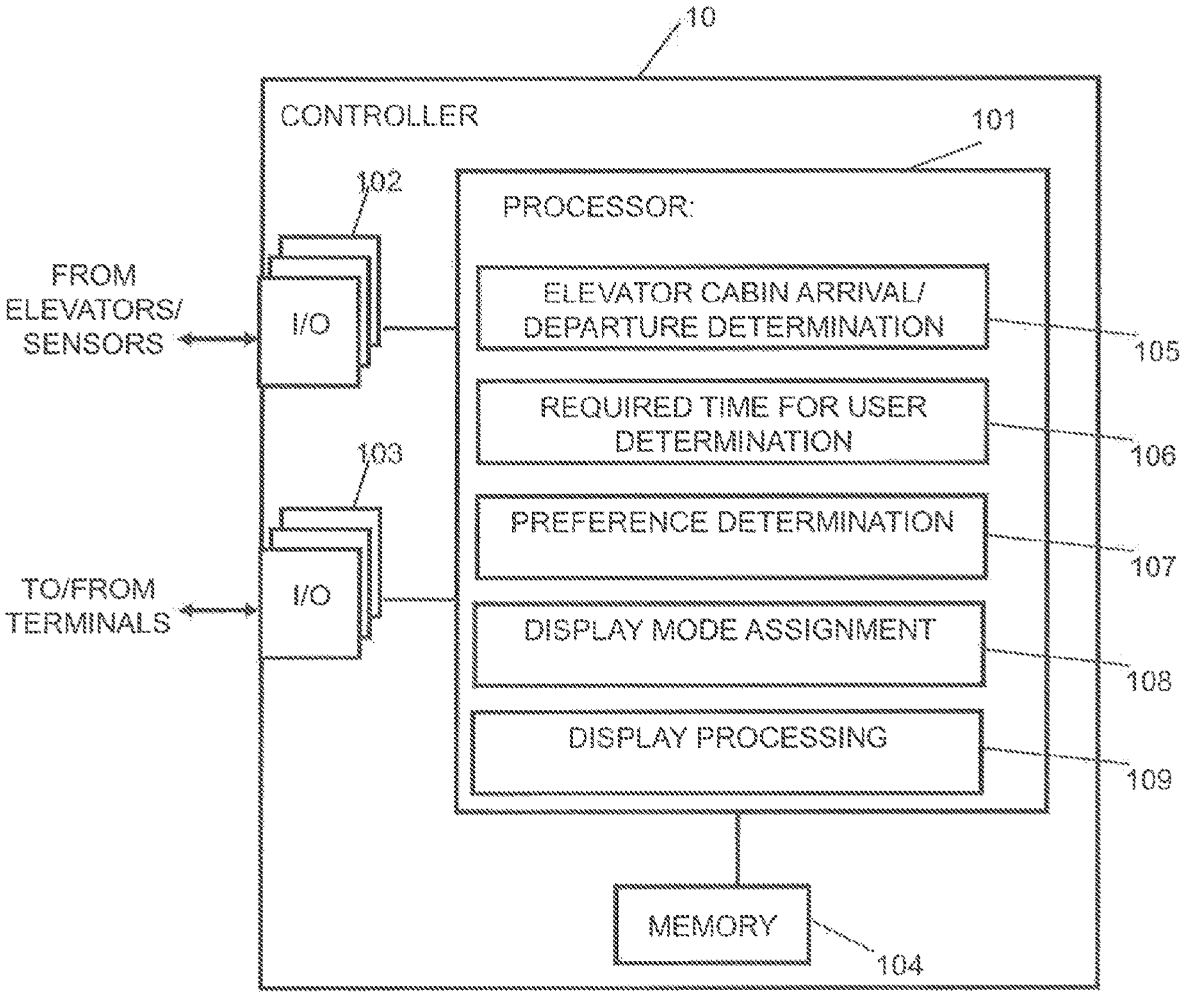
FIG. 6 shows a diagram of a configuration of a control device of an elevator monitoring system according to some examples of embodiments.

FIG. 6 shows a diagram of a configuration of a controlling device according to some examples of embodiments, which is configured to implement a procedure for monitoring an elevator system as described in connection with some of the examples of embodiments. It is to be noted that the controlling device 10, which comprises function of the controller 10 of FIGS. 1 and 2, may include further elements or functions besides those described herein below. Furthermore, even though reference is made to a device like a controller, the device or function may be also another device or function having a similar task, such as a chipset, a chip, a module, an application etc., which can also be part of a controller or attached as a separate device to a controller, or the like. It should be understood that each block and any combination thereof may be implemented by various means or their combinations, such as hardware, software, firmware, one or more processors and/or circuitry.

The controlling device 10 shown in FIG. 6 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 102 and 103 denote input/output (I/O) units or functions (interfaces) connected to the processor or processing function 101. The I/O units 102 may be used for communicating with elements or function such as elevators or sensors, as described in connection with FIG. 2, for example. The I/O units 103 may be used for communicating with elements or function such as operation terminals, as described in connection with FIG. 2, for example. The I/O units 102 and 103 may be a combined unit including interface or communication equipment towards several elements, or may include a distributed structure with a plurality of different interfaces for different elements. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described monitoring and displaying procedures. In particular, the processor or processing circuitry or function 101 includes one or more of the following sub-portions. Sub-portion 105 is a processing portion which is usable as a portion for determining an elevator car's arrival/departure time. The portion 105 may be configured to perform processing according to S110 of FIG. 5. Furthermore, the processor or processing circuitry or function 101 may include a sub-portion 106 usable as a portion for determining the required time for a user to reach the elevators. The portion 106 may be configured to perform a processing according to S120 of FIG. 5. In addition, the processor or processing circuitry or function 101 may include a sub-portion 107 usable as a portion for determining a preference or preference order for the elevators. The portion 107 may be configured to perform a processing according to S130 of FIG. 5.

Moreover, the processor or processing circuitry or function 101 may include a sub-portion 108 usable as a portion for assigning a display mode. The portion 108 may be configured to perform a processing according to S140 of FIG. 5. Furthermore, the processor or processing circuitry or function 101 may include a sub-portion 109 usable as a portion for displaying processing. The portion 109 may be configured to perform a processing according to S150 of FIG. 5.

It is to be noted that according to some further examples of embodiments variations to the above described measures are possible. For example, instead of an operation terminal comprising both of the display means and the input means, the operation terminal may have only a display functionality.

In addition, according to another example of embodiments, there is provided a device comprising at least one processing circuitry, and at least one memory for storing instructions to be executed by the processing circuitry, wherein the at least one memory and the instructions are configured to, with the at least one processing circuitry, cause the device at least: to monitor a plurality of elevators, wherein at least two of the plurality of elevators are set into a shuttle mode in which the corresponding elevator travels between two pre-defined floors, to calculate at least one of an arrival time and a departure time of an elevator car of each of the at least two elevators in the shuttle mode at a predetermined floor; to determine a time required by a user for reaching each of the at least two elevators in the shuttle mode from an operation terminal location; to calculate a preference order of the at least two elevators in the shuttle mode on the basis of the time of arrival and/or departure of the elevator car of each of the at least two elevators in the shuttle mode and the time required by the user for reaching each of the at least two elevators in the shuttle mode from the operation terminal location; to assign one of a plurality of display modes to each of the at least two elevators in the shuttle mode according to the preference order; and to cause displaying of an elevator identification according to the preference order by using the assigned display mode.

Furthermore, according to some other examples of embodiments, in the above defined device, the at least one memory and the instructions may be further configured to, with the at least one processing circuitry, cause the device to conduct at least one of the processing defined in the above described methods, for example a method according that described in connection with FIG. 5.

As described above, according to some examples of embodiments, procedures and elements allowing to improve efficiency and user experience when using an elevator system having a plurality of elevators of which some are operated in a so-called shuttle mode are provided. By means of the proposed procedures and elements being described above, it is possible to support passengers to get in the correct elevators during peak traffic hours, wherein the passengers can easily recognize from the terminal display which elevators are the next leaving elevators in range.

In addition, it is possible to react to a crowdedness factor in the lobby, and to guide the user in such a manner that he/she does not remain in lobby for an unnecessarily long time. By means of the proposed measures, it is possible to reduce the number of persons being present in the lobby by suitably directing them to an elevator in shuttle mode, which is useful for example in case of peak times of elevator usage. Moreover, when selecting the closest elevator rather than the elevator having the shortest waiting time, it is made easier for the user to find the correct elevator, especially in a crowded lobby.

Moreover, examples of embodiments are easy to implement. For example, when using already existing sensors display screens, no additional elements are required to be installed. Furthermore, also already installed elevator systems can be modified, e.g. by providing an external or central display screen connected to a controller, to allow application of the invention.

It should be appreciated that embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, a device may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. A method including monitoring a plurality of elevators, wherein at least two of the plurality of elevators are set into a shuffle mode in which the corresponding elevator travels between two pre-defined floors;

calculating at least one of an arrival time and a departure time of an elevator car of each of the at least two elevators in the shuttle mode at a predetermined floor;

determining a time required by a user for reaching each of the at least two elevators in the shuttle mode from an operation terminal location;

calculating a preference order of the at least two elevators in the shuttle mode on the basis of the time of arrival and/or departure of the elevator car of each of the at least two elevators in the shuttle mode and the time required by the user for reaching each of the at least two elevators in the shuffle mode from the operation terminal location;

assigning one of a plurality of display modes to each of the at least two elevators in the shuttle mode according to the preference order; and causing displaying of an elevator identification according to the preference order by using the assigned display mode.

2. The method according to claim 1, further including using, when calculating a departure time of an elevator car of each of the at least two elevators in the shuttle mode at a predetermined floor, an estimated stop time period of each of the at least two elevators in the shuttle mode.

3. The method according to claim 1, further including considering a plurality of operation terminals placed at different locations, wherein, when determining the time required by the user for reaching each of the at least two elevators in the shuttle mode, a time from each of the plurality of operation terminals is determined, and, when calculating the preference order of the at least two elevators in the shuttle mode, a preference order for each of the plurality of operation terminals is calculated.

4. The method according to claim 1, further including receiving and processing a request for a specific destination of an elevator transport; and considering, when calculating the preference order of the at least two elevators in the shuttle mode, only those of the at least two elevators in the shuttle mode traveling to the requested destination.

5. The method according to claim 1, further including receiving and processing additional information related to a number of persons already waiting for each of the at least two elevators in the shuttle mode; and considering, when calculating the preference order of the at least two elevators in the shuttle mode, only those of the at least two elevators in the shuttle mode where the number of persons already waiting is smaller than a preset limit number.

6. The method according to claim 1, wherein when calculating the preference order of the at least two elevators in the shuttle mode, the time required by the user for reaching each of the at least two elevators in the shuttle mode from the operation terminal location is subtracted from the time of arrival and/or departure of the elevator car of each of the at least two elevators in the shuttle mode, wherein the smaller the difference value resulting from the subtraction, the higher the rank of each of the at least two elevators in the shuttle mode in the preference order is.

7. The method according to claim 6, further including when the difference value resulting from the subtraction is smaller than a predetermined value, cancelling the corresponding elevator from the preference order or starting a processing for changing at least one of a color and contrast setting used for the display mode.

8. The method according to claim 1, further including determining a crowdedness factor for the predetermined floor, wherein the crowdedness factor defines a number of persons being present in the predetermined floor; and determining a distance between each of the at least two elevators in the shuttle mode and the operation terminal location;

wherein, when calculating the preference order of the at least two elevators in the shuttle mode, the crowdedness factor and the distance are considered as weighting factors, wherein the higher the crowdedness factor, the higher the weighting factor of the distance between each of the at least two elevators in the shuttle mode and the operation terminal location is, wherein the weighting factor for the distance is higher when the distance is shorter.

9. The method according to claim 1, further including determining a status of elevator operation of each of the at least two elevators in the shuttle mode, and adapting the display mode according to the determined status.

10. The method according to claim 1, wherein each of the plurality of display modes includes a specific setting for at least one of a display location of an elevator identification indication on a screen, a dimension of the elevator identification indication, a static contrast of the elevator identification indication, a changeable contrast of the elevator identification indication, a static color of the elevator identification indication, a changeable color of the elevator identification indication, and an indication of a status of elevator operation, wherein a first display mode having a first setting is assigned to that of the at least two elevators in the shuttle mode having the highest rank in the preference order, and at least one second display mode having a setting being different to the first setting is assigned to the others of the at least two elevators in the shuttle mode.

11. A device configured to monitor a plurality of elevators, wherein at least two of the plurality of elevators are set into a shuttle mode in which the corresponding elevator travels between two pre-defined floors, the device including memory storing an elevator monitoring program; and a processor configured to access the elevator monitoring program and perform:

calculating at least one of an arrival time and a departure time of an elevator car of each of the at least two elevators in the shuttle mode at a predetermined floor;

determining a time required by a user for reaching each of the at wo elevators in the shuttle mode from an operation terminal location;

calculating a preference order of the at least two elevators in the shuttle mode on the basis of the time of arrival and/or departure of the elevator car of each of the at least two elevators in the shuttle mode and the time required by the user for reaching each of the at least two elevators in the shuttle mode from the operation terminal location;

assigning one of a plurality of display modes to each of the at least two elevators in the shuttle mode according to the preference order; and causing displaying of an elevator identification according to the preference order by using the assigned display mode.

12. An elevator system including a plurality of elevators, wherein at least two of the plurality of elevators are set into a shuttle mode in which the corresponding elevator travels between two pre-defined floors;

at least one operation terminal including a display for displaying information related to the at least two elevators in the shuttle mode;

a controller configured to calculate at least one of an arrival time and a departure time of an elevator car of each of the at least two elevators in the shuttle mode at a predetermined floor;

determine a time required lyre a user for reaching each of the at least two elevators in the shuttle mode from the location of the at least one operation terminal;

calculate a preference order of the at least two elevators in the shuttle mode on the basis of the time of arrival and/or departure of the elevator car of each of the at least two elevators in the shuttle mode and the time required by the user for reaching each of the at least two elevators in the shuttle mode from the operation terminal location; and assign one of a plurality of display modes to each of the at least two elevators in the shuttle mode according to the preference order;

wherein the at least one operation terminal is further configured to display au elevator identification of the at least two elevators in the shuttle mode according to the preference order and the assigned display mode.

13. A non-transitory computer-readable medium storing software code portions that, when executed by a computer processor, perform the steps of claim 1.

14. The method according to claim 2, further including considering a plurality of operation terminals placed at different locations, wherein, when determining the time required by the user for reaching each of the at least two elevators in the shuttle mode, a time from each of the plurality of operation terminals is determined, and, when calculating the preference order of the at least two elevators in the shuttle mode, a preference order for each of the plurality of operation terminals is calculated.

15. The method according to claim 2, further including receiving and processing a request for a specific destination of an elevator transport; and considering, when calculating the preference order of the at least two elevators in the shuttle mode, only those of the at least two elevators in the shuttle mode traveling to the requested destination.

16. The method according to claim 3, further including receiving and processing a request for a specific destination of an elevator transport; and considering, when calculating the preference order of the at least two elevators in the shuttle mode, only those of the at least two elevators in the shuttle mode traveling to the requested destination.

17. The method according to claim 2, further including receiving and processing additional information related to a number of persons already waiting for each of the at least two elevators in the shuttle mode; and considering, when calculating the preference order of the at least two elevators in the shuttle mode, only those of the at least two elevators in the shuttle mode where the number of persons already waiting is smaller than a preset limit number.

18. The method according to claim 3, further including receiving and processing additional information related to a number of persons already waiting for each of the at least two elevators in the shuttle mode; and considering, when calculating the preference order of the at least two elevators in the shuttle mode, only those of the at least two elevators in the shuttle mode where the number of persons already waiting is smaller than a preset limit number.

19. The method according to claim 2, wherein when calculating the preference order of the at least two elevators in the shuttle mode, the time required by the user for reaching each of the at least two elevators in the shuttle mode from the operation terminal location is subtracted from the time of arrival and/or departure of the elevator car of each of the at least two elevators in the shuttle mode, wherein the smaller the difference value resulting from the subtraction, the higher the rank of each of the at least two elevators in the shuttle mode in the preference order is.

* * * * *